United States Patent
Saito et al.

(10) Patent No.: US 9,844,743 B2
(45) Date of Patent: Dec. 19, 2017

(54) OIL DETERIORATION PREVENTION DEVICE

(71) Applicants: TOYOTA BOSHOKU KABUSHIKI KAISHA, Aichi (JP); TOYOTA JIDOSHA KABUSHIKI KAISHA, Aichi (JP)

(72) Inventors: Yasuhiro Saito, Aichi (JP); Hideto Morishita, Gifu (JP); Ippei Fukutomi, Tokyo (JP); Motoichi Murakami, Shizuoka (JP); Katsuichi Miyasaka, Shizuoka (JP); Masatoshi Hiyoshi, Aichi (JP); Koji Morita, Shizuoka (JP)

(73) Assignees: TOYOTA BOSHOKU KABUSHIKI KAISHA, Aichi (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 399 days.

(21) Appl. No.: 14/350,413

(22) PCT Filed: Oct. 18, 2012

(86) PCT No.: PCT/JP2012/077006
§ 371 (c)(1),
(2) Date: Apr. 8, 2014

(87) PCT Pub. No.: WO2013/069429
PCT Pub. Date: May 16, 2013

(65) Prior Publication Data
US 2014/0263022 A1    Sep. 18, 2014

(30) Foreign Application Priority Data

Nov. 7, 2011  (JP) ................. 2011-243927

(51) Int. Cl.
*B01D 24/10* (2006.01)
*B01D 25/24* (2006.01)
(Continued)

(52) U.S. Cl.
CPC ............. *B01D 24/10* (2013.01); *B01D 25/24* (2013.01); *B01D 29/13* (2013.01); *B01D 29/21* (2013.01);
(Continued)

(58) Field of Classification Search
CPC ........ B01D 24/10; B01D 25/24; B01D 29/13; B01D 29/21; B01D 29/54; B01D 37/025;
(Continued)

(56) References Cited

U.S. PATENT DOCUMENTS 1,084,030 A    1/1914  Ramsey
1,981,089 A    11/1934 Carpenter
(Continued)

FOREIGN PATENT DOCUMENTS

CN    103906900    7/2014
DE    603 06 401 T2    6/2007
(Continued)

OTHER PUBLICATIONS

Japan Office action, dated Jun. 3, 2014, along with an English translation thereof.
(Continued)

*Primary Examiner* — Lucas Stelling
(74) *Attorney, Agent, or Firm* — Greenblum & Bernstein, P.L.C.

(57) ABSTRACT

An oil deterioration prevention device is provided that can prevent an increase in pressure loss by reducing oilflow resistance. The oil deterioration prevention device may include a filtering unit including a filter element that filters oil, and a deterioration prevention unit including a powdery (Continued)

deterioration prevention agent that prevents deterioration of oil, wherein the deterioration prevention unit includes a passage wall that retains the deterioration prevention agent and forms an oil passage.

5 Claims, 9 Drawing Sheets

(51) Int. Cl.
| | |
|---|---|
| B01D 29/13 | (2006.01) |
| B01D 29/21 | (2006.01) |
| B01D 29/54 | (2006.01) |
| B01D 35/00 | (2006.01) |
| F01M 1/10 | (2006.01) |
| F01M 9/02 | (2006.01) |
| F01M 11/03 | (2006.01) |
| B01D 37/02 | (2006.01) |

(52) U.S. Cl.
CPC .......... *B01D 29/54* (2013.01); *B01D 35/005* (2013.01); *B01D 37/025* (2013.01); *F01M 1/10* (2013.01); *F01M 9/02* (2013.01); *F01M 11/03* (2013.01); *F01M 2001/1014* (2013.01); *F01M 2001/1057* (2013.01)

(58) Field of Classification Search
CPC . F01M 1/10; F01M 9/02; F01M 11/03; F01M 2001/1014; F01M 2001/1057
See application file for complete search history.

(56) References Cited

U.S. PATENT DOCUMENTS

| | | | |
|---|---|---|---|
| 2,073,442 A | | 3/1937 | Briggs |
| 2,083,546 A | | 6/1937 | Aldham |
| 2,098,725 A | | 11/1937 | Hurn |
| 2,103,434 A | | 12/1937 | Pennebake |
| 2,110,009 A | | 3/1938 | Weidenbacke |
| 2,148,708 A | | 2/1939 | Orr |
| 2,154,565 A | | 4/1939 | Fife |
| 2,181,608 A | | 11/1939 | Russel et al. |
| 2,207,399 A | | 7/1940 | Gaertner |
| 2,209,180 A | | 7/1940 | Pentz |
| 2,233,093 A | | 2/1941 | Carman et al. |
| 2,300,014 A | | 10/1942 | Saussure |
| 2,328,131 A | | 8/1943 | Eisler |
| 2,680,520 A | | 6/1954 | Beardsley |
| 2,785,805 A | | 3/1957 | Hough |
| 2,995,253 A | | 8/1961 | Belgarde et al. |
| 3,054,507 A | * | 9/1962 | Humbert, Jr. .......... B01D 27/06 210/440 |
| 3,095,370 A | | 6/1963 | Krogman |
| 3,144,407 A | | 8/1964 | Olmos |
| 3,158,571 A | | 11/1964 | Supinger |
| 3,210,229 A | | 10/1965 | Feine |
| 3,224,592 A | * | 12/1965 | Burns .................. B01D 37/025 162/145 |
| 3,312,350 A | | 4/1967 | Kasten |
| 3,390,778 A | | 7/1968 | Uhen |
| 3,465,883 A | | 9/1969 | Jumper |
| 3,467,256 A | | 9/1969 | Humbert, Jr. et al. |
| 3,529,719 A | | 9/1970 | Graybill |
| 3,591,010 A | | 7/1971 | Pall et al. |
| 3,837,495 A | | 9/1974 | Baldwin |
| 3,975,273 A | | 8/1976 | Shaltz et al. |
| 4,036,755 A | | 7/1977 | Dahm et al. |
| 4,048,071 A | | 9/1977 | Yamada et al. |
| 4,094,791 A | | 6/1978 | Conrad |
| 4,144,166 A | | 3/1979 | DeJovine |
| 4,384,962 A | | 5/1983 | Harris |
| 4,557,829 A | | 12/1985 | Fields |
| 4,695,377 A | | 9/1987 | Medley, III |
| 4,802,979 A | | 2/1989 | Medley, III |
| 4,828,698 A | | 5/1989 | Jewell et al. |
| 4,950,400 A | | 8/1990 | Girondi |
| 5,017,285 A | | 5/1991 | Janik et al. |
| 5,035,797 A | | 7/1991 | Janik |
| 5,069,799 A | | 12/1991 | Brownawell et al. |
| 5,078,877 A | | 1/1992 | Cudaback et al. |
| 5,084,170 A | | 1/1992 | Janik et al. |
| 5,591,330 A | | 1/1997 | Lefebvre |
| 5,718,258 A | | 2/1998 | Lefebvre et al. |
| 5,725,031 A | | 3/1998 | Bilski et al. |
| 6,045,692 A | | 4/2000 | Bilski et al. |
| 6,379,564 B1 | | 4/2002 | Rohrbach et al. |
| 6,391,193 B1 | | 5/2002 | Luka |
| 6,919,023 B2 | | 7/2005 | Merritt et al. |
| 6,969,461 B2 | | 11/2005 | Beard et al. |
| 6,984,319 B2 | | 1/2006 | Merritt et al. |
| 7,018,531 B2 | | 3/2006 | Eilers et al. |
| 7,132,047 B2 | | 11/2006 | Beard et al. |
| 7,182,863 B2 | | 2/2007 | Eilers et al. |
| 7,232,521 B2 | | 6/2007 | Merritt et al. |
| 7,238,285 B2 | | 7/2007 | Hacker et al. |
| 7,250,126 B2 | | 7/2007 | Haberkamp et al. |
| 7,267,769 B2 | | 9/2007 | Baird |
| 7,323,102 B2 | | 1/2008 | Klein et al. |
| 7,410,572 B2 | | 8/2008 | Baird et al. |
| 7,811,462 B2 | | 10/2010 | Eilers et al. |
| 7,931,817 B2 | | 4/2011 | Bilski |
| 8,327,818 B2 | | 12/2012 | Jefferies et al. |
| 8,425,772 B2 | | 4/2013 | Martin et al. |
| 8,772,208 B2 | | 7/2014 | Fukutomi et al. |
| 2002/0043495 A1 | | 4/2002 | Beard et al. |
| 2003/0111398 A1 | | 6/2003 | Eilers et al. |
| 2003/0226793 A1 | | 12/2003 | Merritt et al. |
| 2004/0140254 A1 | | 7/2004 | Merritt et al. |
| 2004/0140255 A1 | | 7/2004 | Merritt et al. |
| 2004/0178142 A1 | | 9/2004 | Koslow |
| 2005/0040092 A1 | | 2/2005 | Eilers et al. |
| 2005/0173325 A1 | | 8/2005 | Klein et al. |
| 2005/0194301 A1 | * | 9/2005 | Hacker ................ B01D 37/025 210/232 |
| 2006/0000760 A1 | | 1/2006 | Beard et al. |
| 2006/0032814 A1 | | 2/2006 | Haberkamp et al. |
| 2006/0065601 A1 | | 3/2006 | Baird |
| 2007/0034559 A1 | | 2/2007 | Baird et al. |
| 2008/0135467 A1 | * | 6/2008 | Martin ................ B01D 37/025 210/209 |
| 2010/0108018 A1 | | 5/2010 | Jefferies et al. |
| 2010/0163496 A1 | | 7/2010 | Bilski |
| 2011/0084010 A1 | | 4/2011 | Mordukhovich et al. |
| 2011/0278215 A1 | | 11/2011 | Martin et al. |
| 2012/0238480 A1 | | 9/2012 | Fukutomi et al. |
| 2012/0312731 A1 | | 12/2012 | Ohmiya et al. |

FOREIGN PATENT DOCUMENTS

| | | |
|---|---|---|
| EP | 0842689 | 5/1998 |
| JP | S61-29764 | 7/1986 |
| JP | 62-021289 | 5/1987 |
| JP | 63-005762 | 2/1988 |
| JP | S63-46088 | 12/1988 |
| JP | 03-174207 | 7/1991 |
| JP | H03-296408 | 12/1991 |
| JP | 10-071306 | 3/1998 |
| JP | 11-022442 | 1/1999 |
| JP | 2001-38119 | 2/2001 |
| JP | 2003-532536 | 11/2003 |
| JP | 2005-502803 | 1/2005 |
| JP | 2008-126088 | 6/2008 |
| JP | 2008-540123 | 11/2008 |
| JP | 2011-256826 | 12/2011 |
| WO | WO01/85882 | 11/2001 |
| WO | 03/010421 | 2/2003 |

(56) References Cited

FOREIGN PATENT DOCUMENTS

| WO | WO2006/127652 | 11/2006 |
|---|---|---|
| WO | 2008/112997 | 9/2008 |
| WO | WO 2011/093519 | 8/2011 |

OTHER PUBLICATIONS

Japan Office action, dated Oct. 29, 2013 along with an English translation thereof.
International Search Report dated Jan. 8, 2013.
Search report from E.P.O., dated Nov. 3, 2014.
Xiu S. Zhao et al., "Advances in Mesoporous Molecular Sieve MCM-41", American Chemical Society, Jun. 1, 1996, pp. 2075-2090.
S. Balci, "Effect of heating and acid pre-treatment on pore size distribution of sepiolite", The Mineralogical Society, Jan. 15, 1999, pp. 647-655.
Y.C. Ke et al., "Polymer-Layered Silicate and Silica Nanocomposites", Elsevier, Amsterdam, 2005, 3 total pages.
U.S. Appl. No. 14/350,409, filed Oct. 18, 2012.
U.S. Appl. No. 13/865,509, filed Apr. 18, 2013.
Office Action issued in U.S. Appl. No. 14/350,409, dated Feb. 27, 2017.
Office Action issued in U.S. Appl. No. 14/350,409, dated Sep. 5, 2017.
Office Action issued in European Patent Office (EPO) Counterpart Patent Appl. No. 12846907.9, dated Sep. 5, 2017.

* cited by examiner

OIL DETERIORATION PREVENTION DEVICE

TECHNICAL FIELD

The present invention relates to an oil deterioration prevention device, and more particularly, to an oil deterioration prevention device that can prevent increase in pressure loss by reducing oilflow resistance.

BACKGROUND ART

There has been conventionally known a filter element including fine particles (e.g., hydrotalcite) and fibers for removing carbon, acid, and deteriorated substances produced in an internal combustion engine (e.g., see Patent Literature 1). As illustrated in FIG. 15, in an oil filter using this filtering element, a housing 102 housing a filter element 110 is provided with an oil inflow passage 107 for allowing oil fed from an oil pan to flow into the housing 102, and an oil outflow passage 108 for allowing oil filtered by the filter element 110 to flow to a part to be lubricated in an engine (e.g., a crankshaft, a cylinder wall, and a valve mechanism). The oil flown into the housing 102 from the oil inflow passage 107 is filtered by the filter element 110 with carbon being removed therefrom by fine particles 115, and then, is flown to the part to be lubricated in the engine from the oil outflow passage 108.

CITATION LIST

Patent Literature

[Patent Literature 1] Japanese Unexamined Patent Publication No. 03-296408

DISCLOSURE OF INVENTION

Problem to be Solved by the Invention

However, the conventional oil filter employs a system in which all oil fed from the oil pan passes through the filter element (a so-called full-flow system), so that it entails a problem of increase in pressure loss because the fine particles, such as hydrotalcite, forming the filter element acts as resistance.

The present invention is accomplished in view of the foregoing circumstance, and aims to provide an oil deterioration prevention device that can prevent the increase in pressure loss by reducing oilflow resistance.

Means for Solving Problem

To solve the problems above, the invention described in claim 1 is an oil deterioration prevention device which is summarized that comprising: a filtering unit including a filter element that filters oil; and a deterioration prevention unit including a powdery deterioration prevention agent that prevents deterioration of oil, wherein the deterioration prevention unit includes a passage wall that retains the deterioration prevention agent and forms an oil passage.

The invention described in claim 2 is the oil deterioration prevention device according to claim 1, which is summarized that the passage wall is spirally or concentrically formed.

The invention described in claim 3 is the oil deterioration prevention device according to claim 2, which is summarized that the passage wall has a wave portion formed into a wave shape.

The invention described in claim 4 is the oil deterioration prevention device according to claim 2 or 3, which is summarized that comprising a housing that axially houses the deterioration prevention unit and the cylindrical filtering unit, wherein a horizontal sectional area of a space between an inner wall of the housing and an outer periphery of the deterioration prevention unit is smaller than a horizontal sectional area of a space between the inner wall of the housing and an outer periphery of the filtering unit, and the housing is provided with an oil inflow port that is open near one end of the deterioration prevention unit in the axial direction on the side apart from the filtering unit.

The invention described in claim 5 is the oil deterioration prevention device according to any one of claims 1 to 3, which is summarized that wherein the passage wall is arranged to cover the outer periphery of the filtering unit.

Effect of the Invention

According to the oil deterioration prevention device of the present invention, deterioration of oil is prevented by the deterioration prevention unit, and oil is filtered by the filtering unit. On the deterioration prevention unit, oil flows along a surface of the passage wall retaining the deterioration prevention agent, whereby deterioration of oil is prevented. Accordingly, the crossflow of oil is realized on the deterioration prevention unit, whereby the increase in pressure loss can be prevented by reducing oilflow resistance.

When the passage wall is spirally or concentrically formed, the deterioration prevention unit can be downsized, as well as a large oil passage can be secured. Therefore, the oilflow resistance can further be reduced, and the oil deterioration prevention effect by the deterioration prevention unit can further be enhanced.

When the passage wall is formed to have a wave shape, a larger oil passage can be secured by increasing the space between the adjacent spiral or concentric passage walls.

The oil deterioration prevention device includes a housing that axially houses the deterioration prevention unit and the cylindrical filtering unit, wherein the horizontal sectional area of the space between the inner wall of the housing and the outer periphery of the deterioration prevention unit is smaller than the horizontal sectional area of the space between the inner wall of the housing and the outer periphery of the filtering unit, and the oil inflow port that is open near one end of the deterioration prevention unit apart from the filtering unit in the axial direction is formed on the housing. In this case, the oil flowing into the housing from the oil inflow passage sequentially flows through the deterioration prevention unit and the filtering unit in this order, and in the deterioration prevention unit, the oil flows more smoothly and surely through the gap between the adjacent spiral or concentric passage walls.

When the passage wall is arranged to cover the outer periphery of the filtering unit, the oil passage can be formed between the inner periphery of the passage wall and the outer periphery of the filtering unit, while downsizing the device.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 14(a) is an explanatory plan view for describing the deterioration prevention unit according to still another embodiment;

EMBODIMENTS OF CARRYING OUT THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Oil Deterioration Prevention Device

Figure 1:
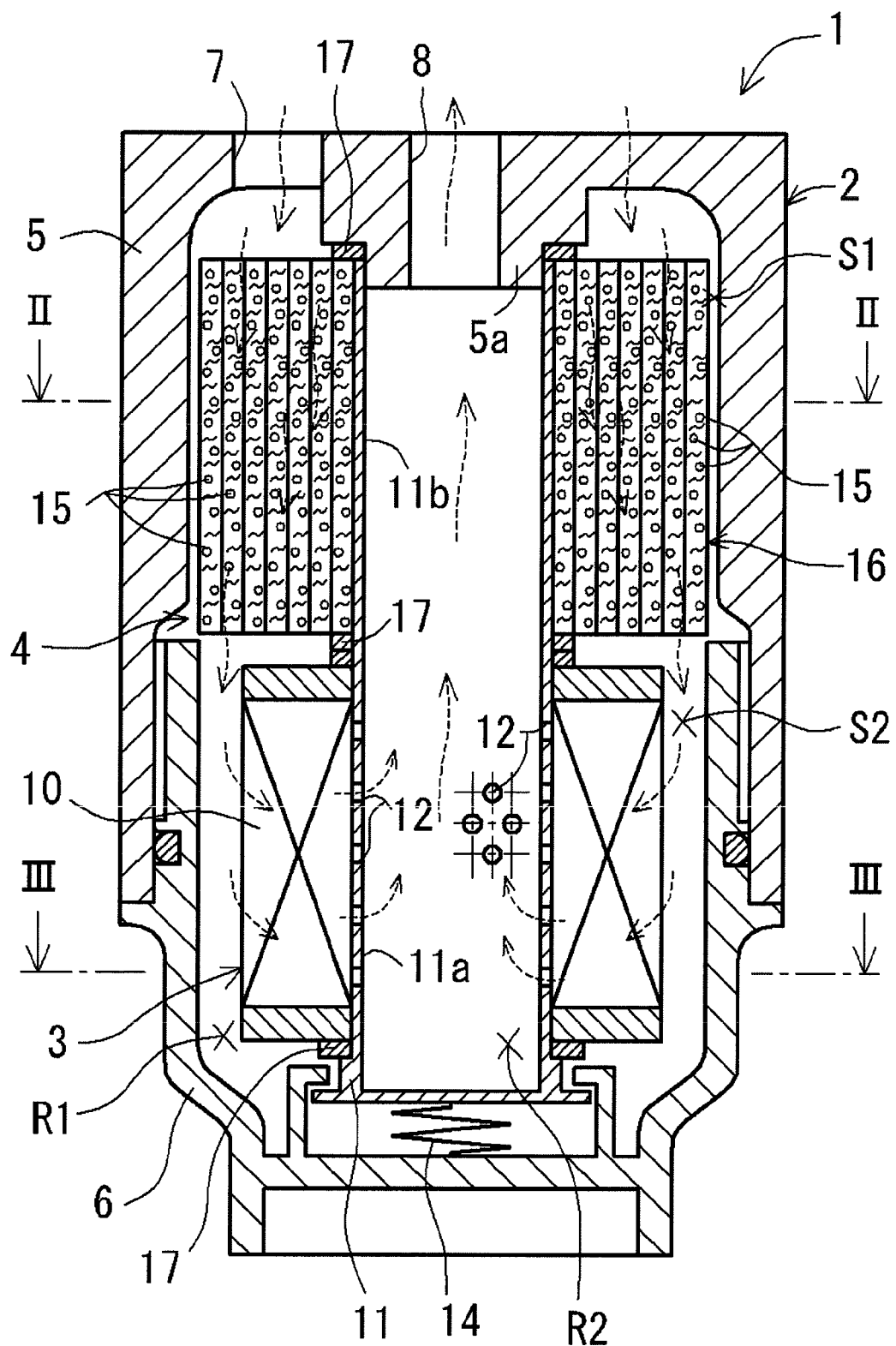
FIG. 1 is a longitudinal sectional view illustrating an oil deterioration prevention device according to the first embodiment.
Figure 6:
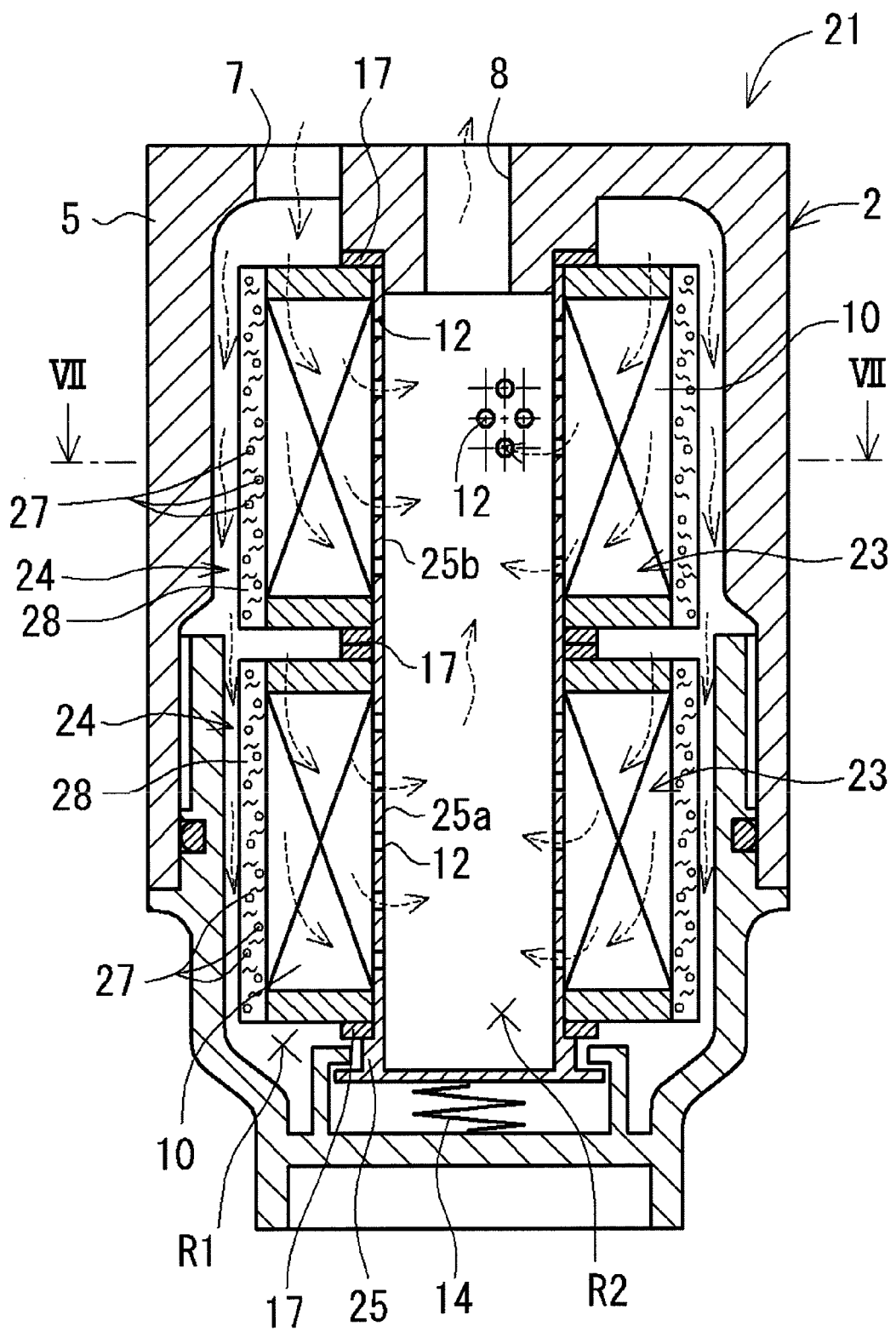
FIG. 6 is a longitudinal sectional view illustrating an oil deterioration prevention device according to the second embodiment.

An oil deterioration prevention device (1, 21) according to the first embodiment includes a filtering unit (3, 23) including a filter element (10) that filters oil, and a deterioration prevention unit (4, 24) including a powdery deterioration prevention agent (15, 27) preventing deterioration of oil, wherein the deterioration prevention unit includes a passage wall (16, 28) that retains the deterioration prevention agent and forms an oil passage (see, for example, FIGS. 1 and 6).

The "powdery deterioration prevention agent" described above can employ any type or any deterioration prevention manner, so long as it can prevent deterioration of oil. Examples of the deterioration prevention agent include an inorganic ion-exchange material such as hydrotalcite, bismuth, cerium carbonate, zirconium hydroxide, titanate-supported zirconia, or zirconium oxycarbonate, and an ion-exchange resin material such as DIAION (trade name). The deterioration prevention agent is preferably hydrotalcite among these materials from the viewpoint of adsorptive property of foreign matters in oil (particularly, acid substances generated in the engine), heat resistance, and environment resistance. An average particle diameter of the deterioration prevention agent can be 0.01 to 500 μm (preferably, 5 to 200), for example. The "average particle diameter" means a particle diameter (median diameter) when a cumulative weight becomes 50% in a particle size distribution measurement according to a laser diffractometry.

The "passage wall" can employ any material and any shape, so long as it can retain the deterioration prevention agent and can form the oil passage. This passage wall generally includes a porous layer. Examples of the material for the passage wall include fibrous material such as non-woven cloth, paper, woven fabric, or knitted fabric, an open-cell foamed material such as urethane, and a porous resin film. The porosity of the passage wall can be 0.5 to 0.99 (preferably, 0.8 to 0.99), for example. This configuration can allow the passage wall to retain the deterioration prevention agent in an appropriately dispersed state, and in the passage wall, oil is easy to permeate the passage wall and oil is difficult to pass in the thickness direction. The "porosity" is generally calculated from an equation of {1−[basis weight of passage wall/(thickness of passage wall×density of material forming passage wall)]}. The basis weight of the passage wall means a weight per unit area of the passage wall.

Figure 2:
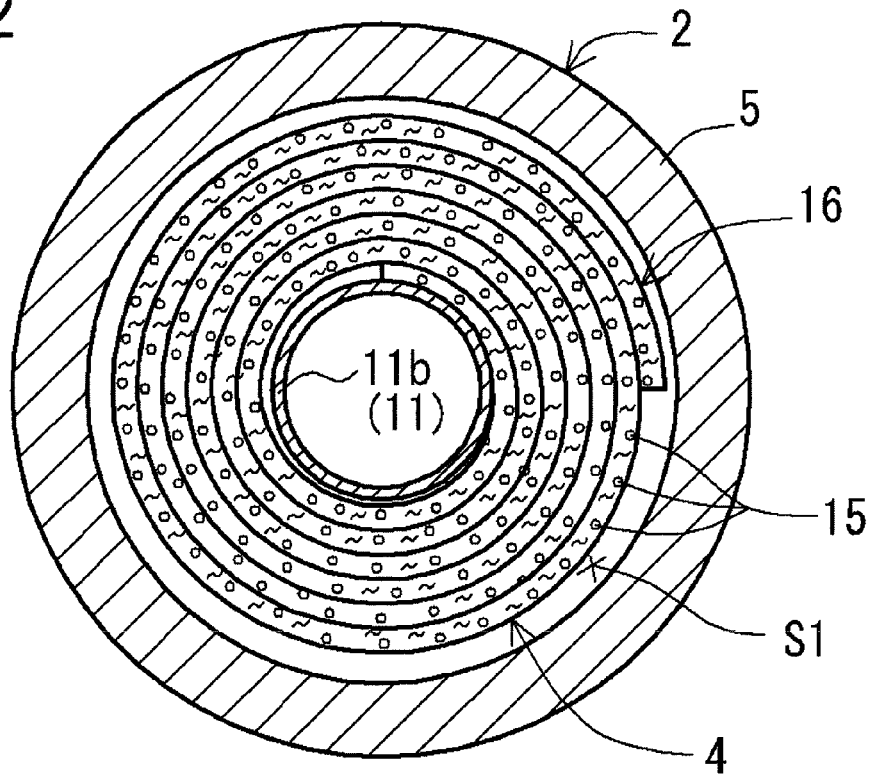
FIG. 2 is an enlarged sectional view taken along a line II-II in FIG. 1.
Figure 9:
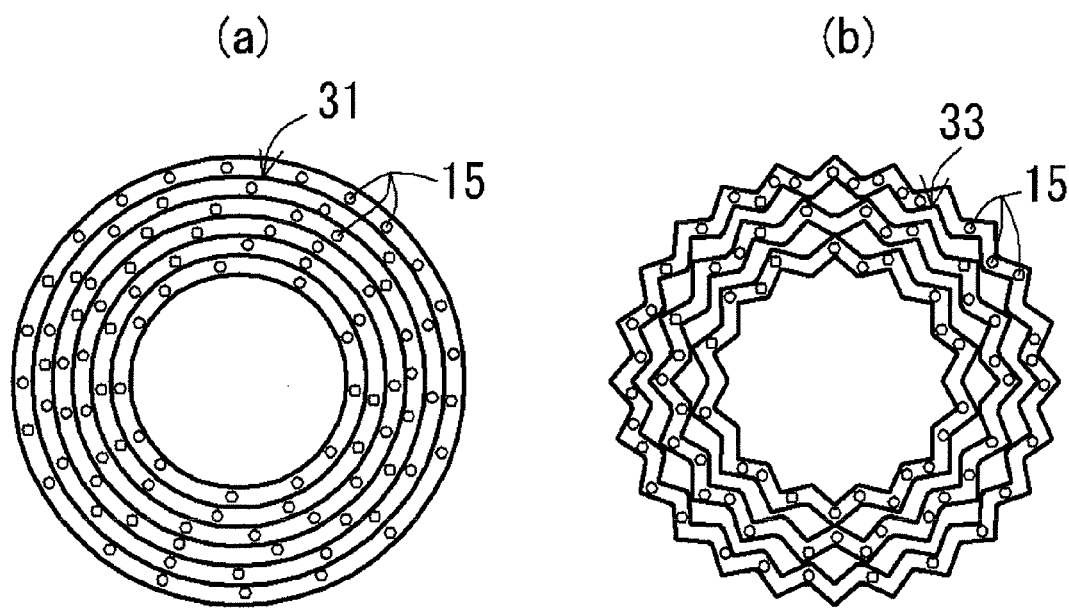
FIG. 9(a) is an explanatory view for describing a deterioration prevention unit according to another embodiment, illustrating that a passage wall is formed concentrically.
FIG. 9(b) is an explanatory view for describing the deterioration prevention unit in FIG. 9(a), illustrating that the passage wall is formed to have a wave shape.
Figure 10:
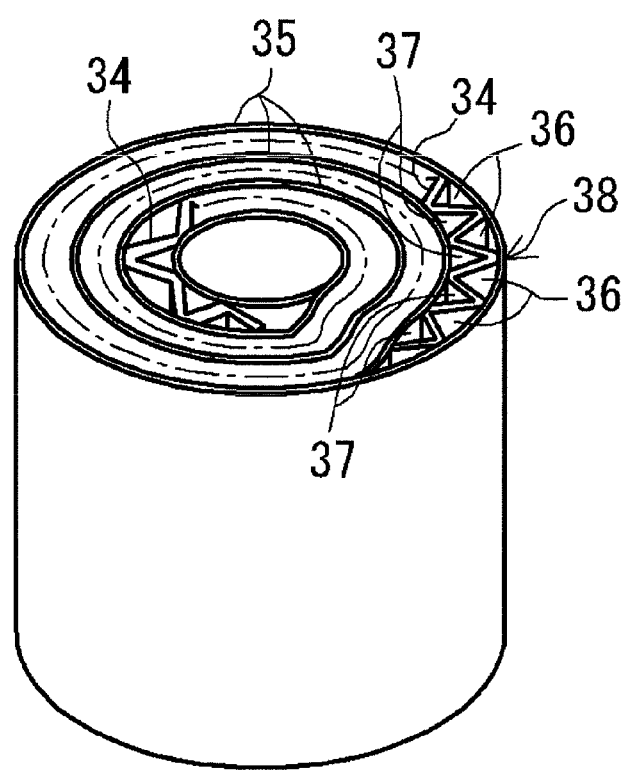
FIG. 10 is a perspective view of a deterioration prevention unit according to still another embodiment.

In the oil deterioration prevention device (1) according to the first embodiment, it can be configured such that, for example, the passage wall (16, 31, 33, 38) is spirally or concentrically formed (see FIGS. 2, 9, and 10). In this case, oil generally flows through the gap between the adjacent passage walls, whereby deterioration of the oil is prevented. The number of turns or thickness of the passage wall can appropriately be selected depending on the oil flow rate.

In the embodiment described above, it can be configured such that, for example, the passage wall (33, 38) is formed to have a wave portion (34) formed into a wave shape (see, for example, FIGS. 9(b) and 10). In this case, it can be configured such that, for example, the passage wall (34) is formed to have a plate-like portion (35) stacked on both surfaces of the wave portion (34) (see FIG. 10, for example). According to this configuration, the oil passage can be formed as a honeycomb structure having high strength.

Figure 3:
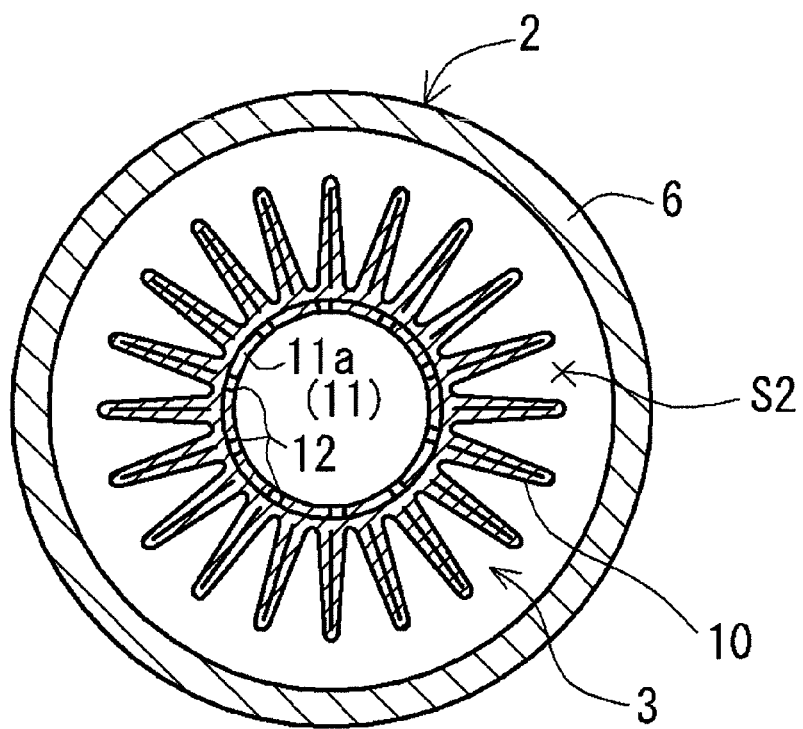
FIG. 3 is an enlarged sectional view taken along a line III-III in FIG. 1.

In the embodiment described above, it can be configured such that, for example, the deterioration prevention device includes the housing (2) that axially houses the deterioration prevention unit (4) and the cylindrical filtering unit (3), wherein the horizontal sectional area (S1) of the space between the inner wall of the housing and the outer periphery of the deterioration prevention unit is smaller than the horizontal sectional area (S2) of the space between the inner wall of the housing and the outer periphery of the filtering unit, and the oil inflow port (7) that is open near one end of the deterioration prevention unit apart from the filtering unit in the axial direction is formed on the housing (see, for example, FIGS. 1 to 3). In this case, it can be configured such that, for example, the oil inflow port (7) is oven facing an end face of the deterioration prevention unit (4) in the axial direction (see FIG. 1, for example). According to this configuration, oil flows more smoothly and surely between the adjacent spiral or concentric passage walls. The ratio (S1/S2) of each horizontal sectional area can be 0.1 to 1 (preferably, 0.25 to 0.75), for example.

For example, the oil deterioration prevention device (21) according to the first embodiment can be configured such that the passage wall (28) is arranged to enclose the outer periphery of the filtering unit (23) (see FIG. 6, for example). In this case, it can be configured such that, for example, the deterioration prevention device includes the housing (2) that houses the filtering unit (23) and the deterioration prevention unit (24), both of a cylindrical shape, wherein the housing is formed with the oil inflow passage (7) that is open facing at least one of the respective end faces of the filtering unit and the deterioration prevention unit in the axial direction (see FIG. 6, for example). According to this configuration, oil flows more smoothly and surely through the gap between the passage wall and the filter element.

EMBODIMENTS

The present invention will be described specifically with reference to the drawings. The present embodiments describe an oil deterioration prevention device that prevents deterioration of engine oil (hereinafter merely referred to as "oil") as examples.

First Embodiment (1) Configuration of Oil Deterioration Prevention Device

An oil deterioration prevention device 1 according to the present embodiment includes a filtering unit 3 and a deterioration prevention unit 4, which are housed in a housing 2 in line in the axial direction, as illustrated in FIG. 1. The housing 2 has a first case 5 and a second case 6, these cases being cylindrical bottomed cases with one end in the axial direction open. These cases 5 and 6 are detachably fixed by each screw portion formed on their open ends.

Figure 5:
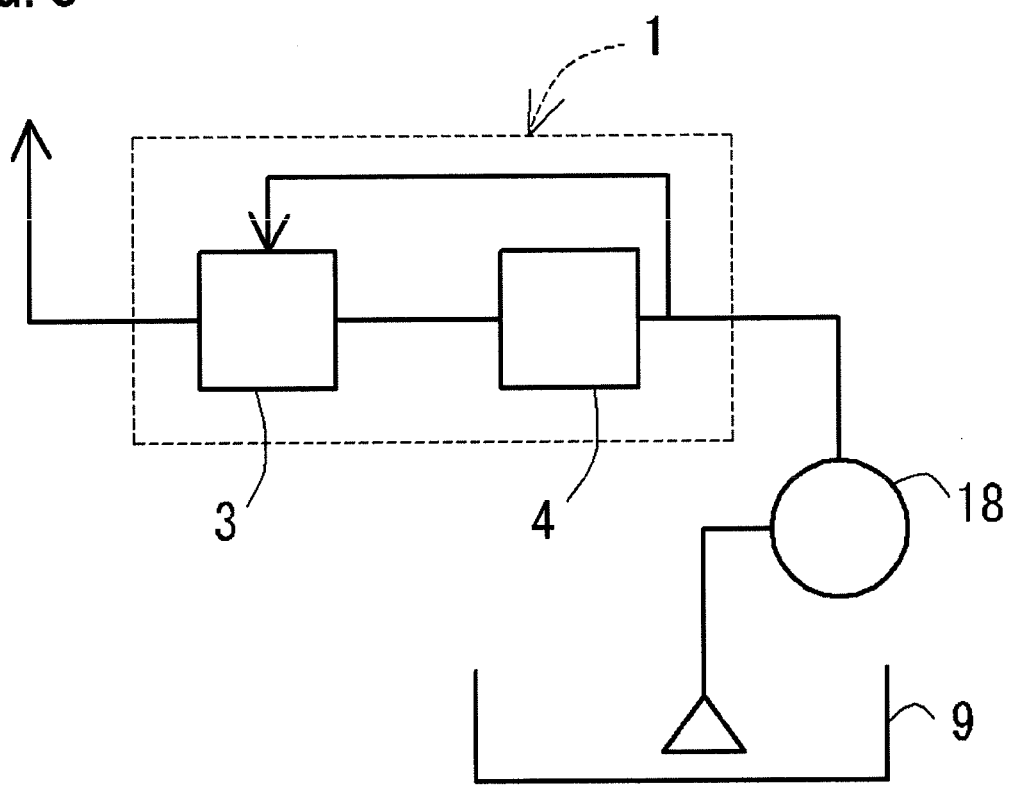
FIG. 5 is an explanatory view for describing an operation of the oil deterioration prevention device.

An oil inflow passage 7 for allowing oil to flow into the housing 2 and an oil outflow passage 8 for allowing oil to flow from the housing 2 are formed on the bottom of the first case 5. The oil inflow passage 7 is open facing an end face of the deterioration prevention unit 4 in the axial direction. The oil inflow passage 7 is connected to an oil pan 9 (see FIG. 5) storing oil via a pipe. The oil outflow passage 8 is also connected to a part to be lubricated in an engine (e.g., a crankshaft, a cylinder wall, a valve mechanism, and the like) via a passage or the like formed in the engine.

As illustrated in FIGS. 1 and 3, the filtering unit 3 includes a filter element 10 filtering oil and a cylindrical protector 11 supporting the filter element 10. The filter element 10 is formed cylindrical (also referred to as chrysanthemum shape) by folding a non-woven sheet material into pleats.

The protector 11 includes a first support portion 11a supporting the filter element 10 and a second support portion 11b continuous with one end of the first support portion 11a and supporting the deterioration prevention unit 4. The first support portion 11a is formed with a number of through-holes 12. The protector 11 is biased toward the first case 5 by a spring 14 provided between one end of the protector 11 in the axial direction and the bottom of the second case 6. The other end of the protector 11 in the axial direction is fitted to a convex portion 5a formed on the bottom of the first case 5.

The internal space of the housing 2 is separated by the filter element 10 and the protector 11 into an upstream space R1 continuous with the oil inflow passage 7, that is, a space before the filtering (in which oil that is not yet filtered is present) and a downstream space R2 continuous with the oil outflow passage 8, that is, a space after the filtering (in which filtered oil is present).

As illustrated in FIGS. 1 and 2, the deterioration prevention unit 4 includes powdery deterioration prevention agents 15, for example made of hydrotalcite, preventing the deterioration of oil, and a passage wall 16 that retains the deterioration prevention agents 15 and forms an oil passage. The passage wall 16 is wound around the outer periphery of the second support portion 11b of the protector 11, and is spirally arranged about the axis of the housing 2. The passage wall 16 is made of a non-woven porous layer, and has the porosity of about 0.90. Accordingly, the passage wall 16 is formed such that the deterioration prevention agents 15 are retained in an appropriately dispersed state, the oil is easy to permeate, and the oil is difficult to pass in the thickness direction. In the present embodiment, the powdery deterioration prevention agents 15 are dispersed and mixed during the process of forming the passage wall 16. The edge of the deterioration prevention unit 4 and the edge of the filtering unit 3 in the axial direction are sealed by a rubber seal member 17.

A horizontal sectional area S1 (see FIG. 2) of a space between the inner peripheral wall of the first case 5 and the outer periphery of the deterioration prevention unit 4 is set to about 240 $mm^2$, and a horizontal sectional area S2 (see FIG. 3) of a space between the inner peripheral wall of the second case 6 and the outer periphery of the filtering unit 3 is set to about 460 $mm^2$. Since the space S1 is set smaller than the space S2, the oil flows smoothly and surely through a gap between the adjacent spiral passage walls 16.

(2) Operation of Oil Deterioration Prevention Device

Figure 4:
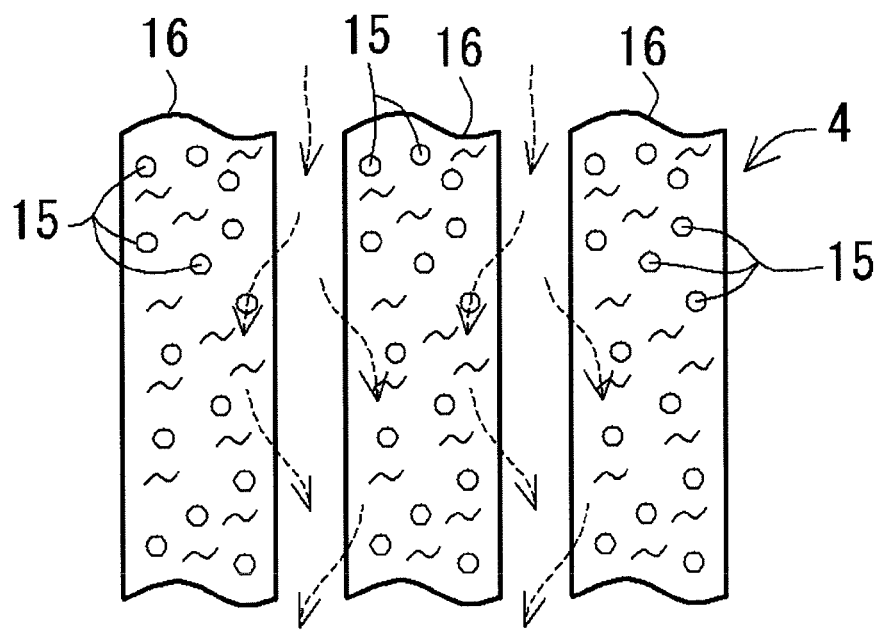
FIG. 4 is an explanatory view for describing an operation of the oil deterioration prevention device.

Subsequently, an operation of the oil deterioration prevention device 1 having the above-mentioned configuration will be described. Oil stored in the oil pan 9 is fed to the oil deterioration prevention device 1 by an operation of a pump 18 (see FIG. 5). As illustrated in FIG. 1, the oil fed into the oil inflow passage 7 flows into the upstream space R1 in the housing 2, and sequentially passes through the deterioration prevention unit 4 and the filtering unit 3 in this order along the axial direction of the housing 2. In the deterioration prevention unit 4, the oil passes through the gap between the adjacent spiral passage walls 16 and the space between the inner wall of the housing 2 and the outermost passage wall 16. In this case, the oil flowing on the surface of the passage wall 16 permeates the passage wall 16 to make contact with the deterioration prevention agents 17, whereby the deterioration of the oil is prevented. Thereafter, the oil returns to the surface of the passage wall 16 (see FIG. 4). The oil passing through the deterioration prevention unit 4 reaches the filtering unit 3 where foreign matters in the oil (e.g., dust, metal wear fragments, sludge, and the like) are trapped by the filter element 10. The oil is then sent to the part to be lubricated in the engine through the downstream space R2 and the oil outflow passage 8 via the through-holes 12 on the protector 11.

(3) Effect of Embodiment

From the above, according to the present embodiment, the deterioration prevention unit 4 prevents deterioration of oil, and the filtering unit 3 filters the oil. In the deterioration prevention unit 4, the oil flows along the surface of the passage wall 16 that retains the deterioration prevention agents 15, whereby deterioration of oil is prevented. Accordingly, the crossflow of oil is realized on the deterioration prevention unit 4, whereby oilflow resistance is reduced, resulting in preventing the increase in pressure loss.

In the present embodiment, the passage wall 16 is spirally formed. Therefore, the deterioration prevention unit 4 can be downsized, and a large oil passage can be secured. Accordingly, the oilflow resistance can further be reduced, and the oil deterioration prevention effect by the deterioration prevention unit 4 can further be enhanced.

According to the present invention, the deterioration prevention device includes the housing 2 that houses the deterioration prevention unit 4 and the cylindrical filtering unit 3 along the axial direction, wherein the horizontal sectional area S1 of the space between the inner wall of the housing 2 and the outer periphery of the deterioration prevention unit 4 is smaller than the horizontal sectional area S2 of the space between the inner wall of the housing 2 and the outer periphery of the filtering unit 3, and the oil inflow port 7 that is open near one end of the deterioration prevention unit 4 apart from the filtering unit 3 in the axial direction is formed on the housing 2. Accordingly, the oil flowing into the housing 2 from the oil inflow passage 7 sequentially flows through the deterioration prevention unit 4 and the filtering unit 3 in this order, and in the deterioration prevention unit 4, the oil flows more smoothly and surely through the gap between the adjacent spiral passage walls 16. In particular, the oil inflow port 7 faces the end face of the deterioration prevention unit 4 in the axial direction in the present embodiment. Therefore, the oil flows more smoothly and surely through the gap between the adjacent spiral passage walls 16.

Second Embodiment

An oil deterioration prevention device according to the second embodiment will next be described. In the oil deterioration prevention device according to the second embodiment, the components substantially same as those in the oil deterioration prevention device according to the first embodiment are identified by the same numerals, and the redundant description will not be repeated.

(1) Configuration of Oil Deterioration Prevention Device

Figure 7:
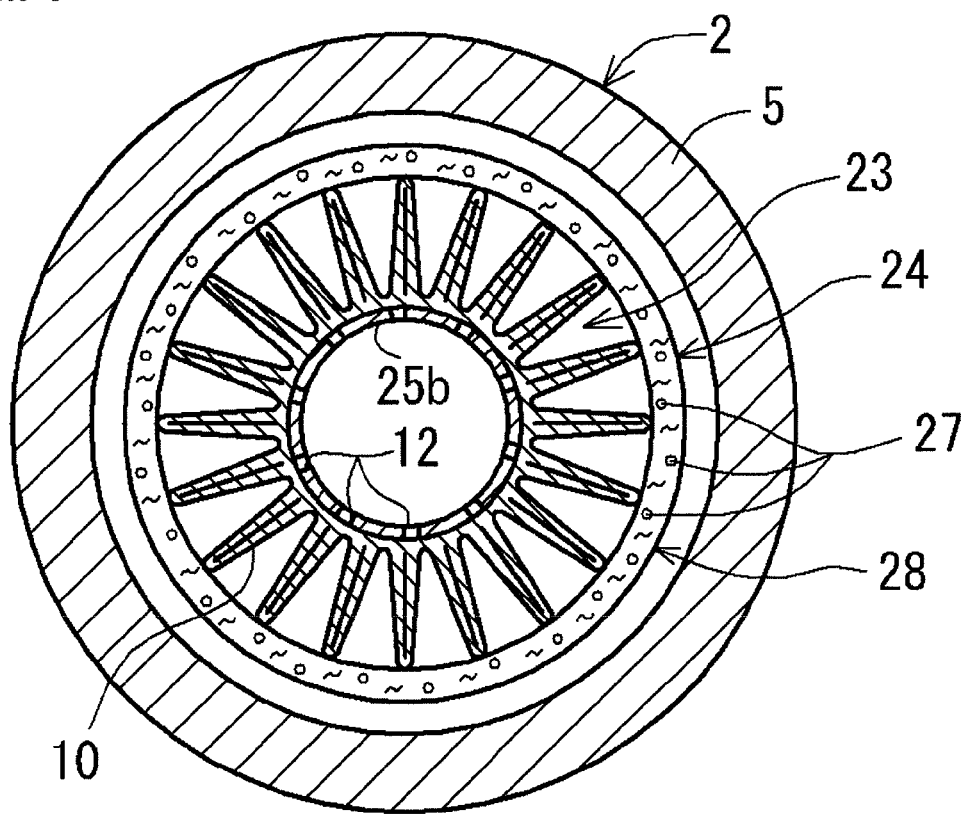
FIG. 7 is an enlarged sectional view taken along a line VII-VII in FIG. 6.

An oil deterioration prevention device 21 according to the present embodiment includes a plurality of sets (in the figure, two sets) of a filtering unit 23 and a deterioration prevention unit 24, which are housed in a housing 2, as illustrated in FIGS. 6 and 7. The housing 2 includes a first case 5 and a second case 6. An oil inflow passage 7 formed on the bottom of the first case 5 is opened facing respective end faces of the filtering unit 23 and the deterioration prevention unit 24 in one of the sets in the axial direction.

The filtering unit 23 includes a filter element 10 that filters oil, and a cylindrical protector 25 that supports the filter element 10. The protector 25 includes a first support portion 25a supporting the filter element 10 in one of the sets, and a second support portion 25b continuous with one end of the first support portion 25a in the axial direction and supporting the filter element 10 in the other set. These support portions 25a and 25b are formed with a number of through-holes 12.

The internal space of the housing 2 is separated by the filter element 10 and the protector 25 into an upstream space R1 continuous with the oil inflow passage 7, that is, a space before the filtering (in which oil that is not yet filtered is present) and a downstream space R2 continuous with the oil outflow passage 8, that is, a space after the filtering (in which filtered oil is present).

The deterioration prevention unit 24 includes powdery deterioration prevention agents 27, for example made of hydrotalcite, for preventing the deterioration of oil, and a cylindrical passage wall 28 that retains the deterioration prevention agents 27 and forms an oil passage. The passage wall 28 is arranged to cover the outer periphery of the filtering unit 23. Specifically, the passage wall 28 is fixed on the outer periphery of the filter element 10 by an adhesive agent. The passage wall 28 is made of a non-woven porous layer, and has the porosity of about 0.98. Accordingly, the passage wall 28 is formed such that the deterioration prevention agents 27 are retained in an appropriately dispersed state, the oil is easy to permeate, and the oil is difficult to pass in the thickness direction. In the present embodiment, the powdery deterioration prevention agents 27 are dispersed and mixed during the process of forming the passage wall 28.

(2) Operation of Oil Deterioration Prevention Device

Figure 8:
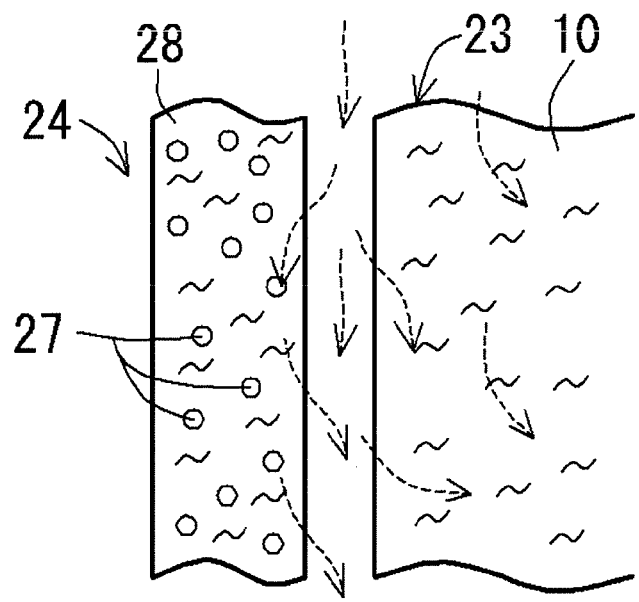
FIG. 8 is an explanatory view for describing an operation of the oil deterioration prevention device.

Subsequently, an operation of the oil deterioration prevention device 21 having the above-mentioned configuration will be described. As illustrated in FIG. 6, the oil fed into the oil inflow passage 7 flows into the upstream space R1 in the housing 2, and sequentially passes through the a plurality of sets of the deterioration prevention unit 24 and the filtering unit 23 along the axial direction of the housing 2. In the deterioration prevention unit 24 and the filtering unit 23 in each set, the oil passes between the inner periphery of the passage wall 28 and the outer periphery of the filter element 10 and between the inner wall of the housing 2 and the outer periphery of the passage wall 28. In this case, the oil flowing on the surface of the passage wall 28 permeates the passage wall 28 to make contact with the deterioration prevention agents 27, whereby the deterioration of the oil is prevented. Thereafter, the oil returns to the surface of the passage wall 28 (see FIG. 8). The oil that is prevented from being deteriorated reaches the filtering unit 23, where foreign matters in the oil (e.g., dust, metal wear fragments, sludge, and the like) are trapped by the filter element 10. The oil is then fed to the part to be lubricated in the engine through the downstream space R2 and the oil outflow passage 6 via the through-holes 12 on the protector 25.

(3) Effect of Embodiment

As described above, the oil deterioration prevention device 21 according to the present embodiment can bring the same operation and effect as those brought by the oil deterioration prevention device 1 according to the first embodiment. In addition, since the passage wall 28 is arranged to cover the outer periphery of the filtering unit 23, the oil passage can be formed between the inner periphery of the passage wall 28 and the outer periphery of the filtering unit 23, while downsizing the device 21.

According to the present embodiment, the oil deterioration prevention device includes the housing 2 that houses the deterioration prevention unit 24 and the cylindrical filtering unit 23, wherein the housing 2 is provided with the oil inflow passage 7 that is open facing the end face of the filtering unit 23 and the deterioration prevention unit 24 in the axial direction. According to this configuration, the oil flows more smoothly and surely through the gap between the passage wall 28 and the filter element 10.

The present invention is not limited to the first and second embodiments, and various modifications are possible without departing form the scope of the present invention according to a purpose and usage. Specifically, the first embodiment describes the passage wall 16 that is arranged spirally. However, the invention is not limited thereto, and a passage wall 31 concentrically arranged may be employed as illustrated in FIG. 9(*a*).

The first and second embodiments illustrate the passage walls 16 and 28 including only a plate-like portion. However, the invention is not limited thereto, and a passage wall 33 including a wave portion formed into a wave shape may be employed as illustrated in FIG. 9(*b*). This configuration increases the gap between the adjacent passage walls 33, whereby a larger oil passage can be secured. For example, a passage wall 38 illustrated in FIG. 10 may be employed. The passage wall 38 includes a wave portion 34 formed into a wave shape, and plate-like portions 35 stacked on both surfaces of the wave portion 34, wherein a first passage 36 is formed between one of the plate-like portions 35 and the wave portion 34, and a second passage 37 is formed between the other plate-like portion 35 and the wave portion 34. According to this configuration, the oil passage can be formed as a honeycomb structure having high strength.

Figure 11:
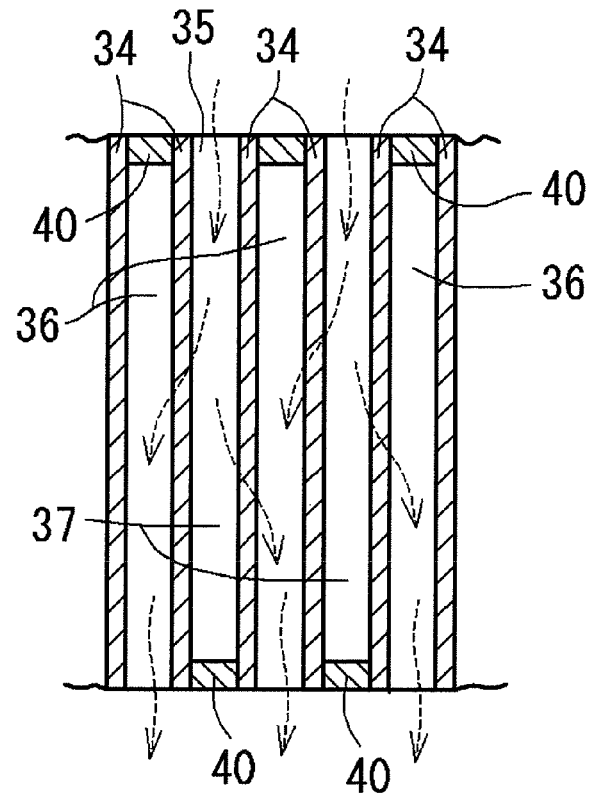
FIG. 11 is a longitudinal development view of the deterioration prevention unit according to still another embodiment.
Figure 12:
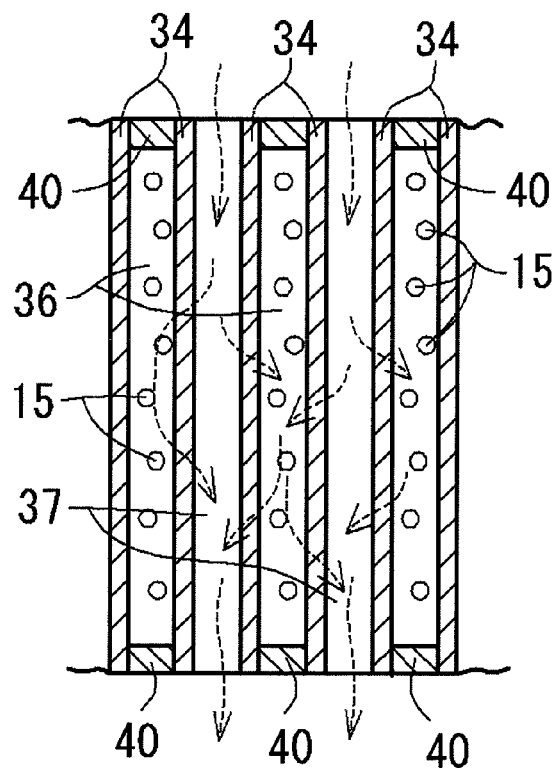
FIG. 12 is a longitudinal development view of the deterioration prevention unit according to still another embodiment.

When the passage wall 38 having the honeycomb structure is employed, one end of the first passage 36 in the longitudinal direction may be sealed by a sealing member 40, and the other end of the second passage 37 in the longitudinal direction may be sealed by the sealing member 40 as illustrated in FIG. 11. As illustrated in FIG. 12, both ends of the first passage 36 in the longitudinal direction may be sealed by the sealing member 40, and deterioration prevention agents may be filled in the first passage 36.

Figure 13:
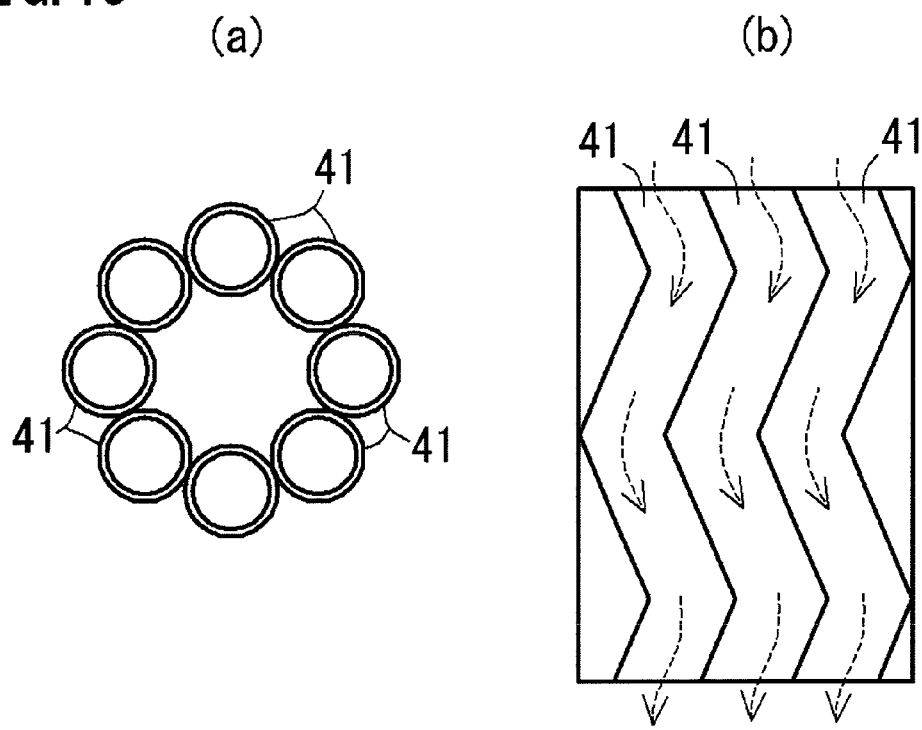
FIG. 13(a) is an explanatory plan view for describing the deterioration prevention unit according to still another embodiment.
FIG. 13(b) is an explanatory front view for describing the deterioration prevention unit according to still another embodiment.
Figure 14:
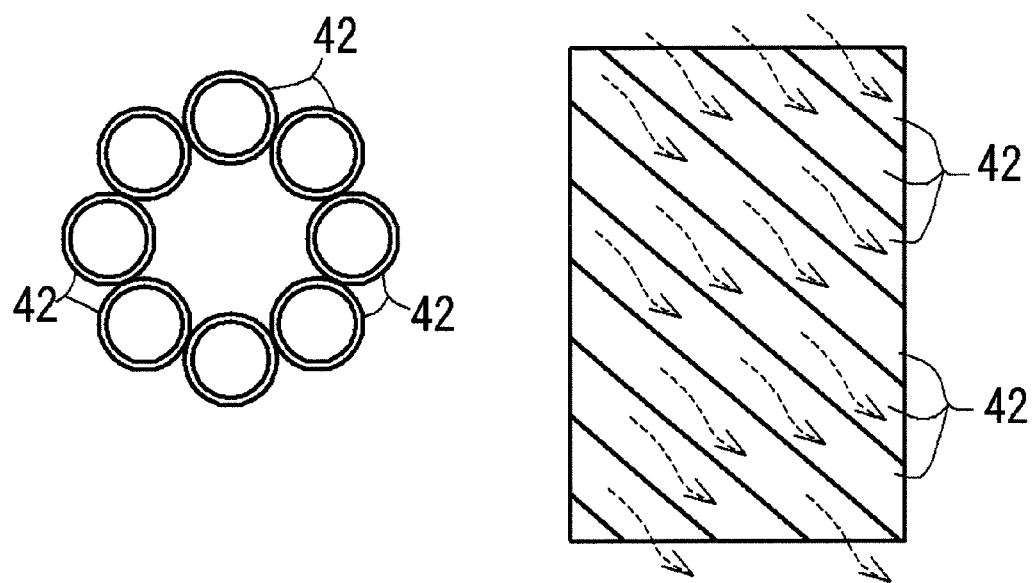
FIG. 14 is an explanatory front view for describing the deterioration prevention unit according to still another embodiment.
Figure 15:
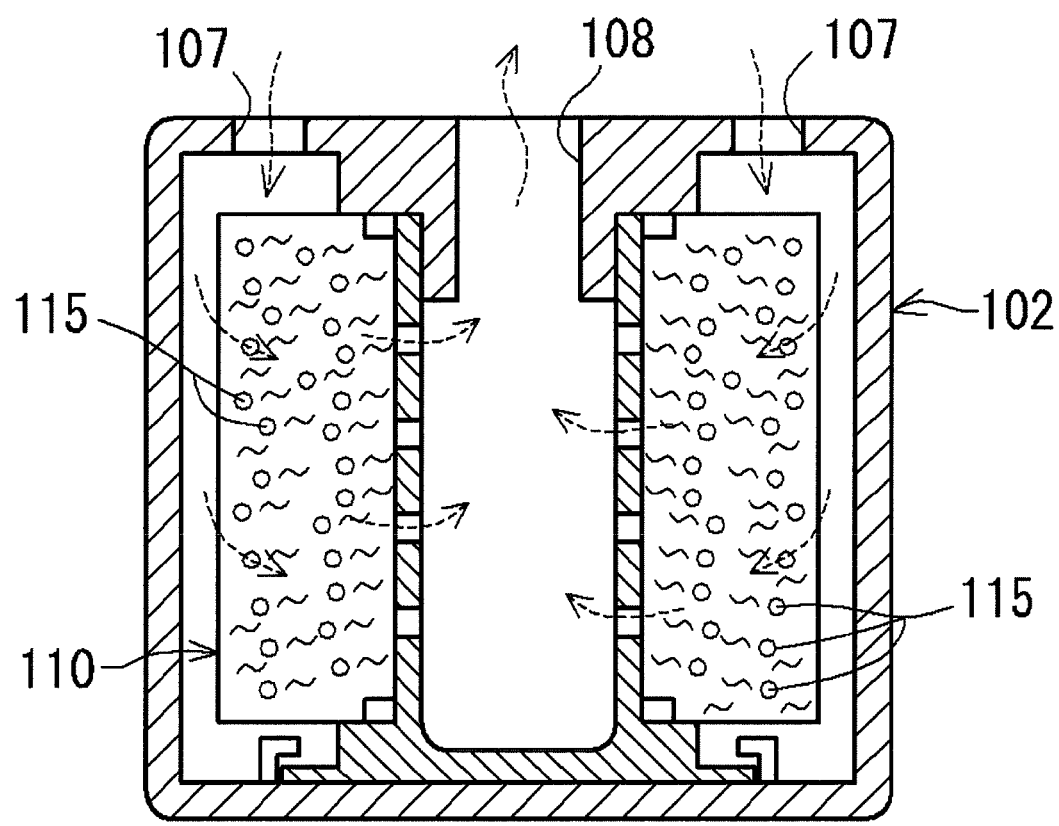
FIG. 15 is a longitudinal sectional view illustrating a conventional oil filter.

The first and second embodiments illustrate the passage walls 16 and 28 on which oil flows along the axial direction of the housing 2. However, the invention is not limited thereto, and a passage wall 41 having a labyrinthine structure in which oil flows tortuously with respect to the axial direction of the housing 2 may be employed as illustrated in FIG. 13, or a passage wall 42 on which oil flows helically about the axis of the housing 2 may be employed as illustrated in FIG. 14.

The first and second embodiments illustrate the non-woven filter element 10. However, the invention is not limited thereto, and usable materials for the filter element include fibrous material such as non-woven cloth, paper, woven fabric, or knitted fabric, a resin open-cell foamed material such as urethane, and a porous resin film.

In the first embodiment, the gap is formed between the inner wall of the housing 2 and the outer peripheral surface of the passage wall 16. However, the invention is not limited thereto, and the outer peripheral surface of the passage wall 16 may be brought into contact with the inner wall of the housing 2, for example. In the second embodiment, the passage wall 28 is fixed on the outer periphery of the filter element 10. However, the invention is not limited thereto, and the passage wall 28 may be fixed on the inner wall of the housing 2, for example. In the second embodiment, a single cylindrical passage wall 28 is employed. However, the invention is not limited thereto, and a spiral or concentric passage wall may be employed, for example.

The first and second embodiments illustrate the oil deterioration prevention devices 1 and 21 in which the housing 2 can be disassembled to replace directly the filtering units 3 and 23 and the deterioration prevention units 4 and 24 (a so-called element replacement type). However, the invention is not limited thereto, and an oil deterioration prevention device of a type in which the whole device including the housing 2 is replaced (a so-called spin-on type) can be employed, for example.

The first and second embodiments illustrate the structure in which the deterioration prevention agents 15 and 27 are retained in the passage walls 16 and 28, and oil permeates the passage walls 16 and 28 to make direct contact with the deterioration prevention agents. However, the invention is not limited thereto. The deterioration prevention agents may be retained to be exposed from the surface of the passage wall, and oil may be brought into contact with the deterioration prevention agents on the surface of the passage wall.

The first and second embodiments illustrate the oil deterioration prevention devices 1 and 21 used in a wet sump engine. However, the invention is not limited thereto. The present invention may be applied to an oil deterioration prevention device used in a dry sump engine, or an oil deterioration prevention device used in an automatic transmission, for example.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

INDUSTRIAL APPLICABILITY

The present invention is widely used as a technique of preventing deterioration of oil. In particular, the present invention is well adaptable as a technique of preventing deterioration of engine oil in vehicles, such as an automobile, a bus, or a track, as well as a rail vehicle including a train such as a railroad train, a construction vehicle, an agricultural vehicle, or an industrial vehicle.

EXPLANATIONS OF LETTERS OR NUMERALS 1, 21; oil deterioration prevention device, 2; housing 3, 23; filtering unit 4, 24; deterioration prevention unit 10; filter element 15, 27; deterioration prevention agent 16, 28, 31, 33, 38, 41, 42; passage wall

The invention claimed is:

1. An oil deterioration prevention device comprising:
a filtering unit including a filter element that filters oil;
a deterioration prevention unit including a powdery deterioration prevention agent that prevents deterioration of oil, wherein
the deterioration prevention unit includes passage walls that retain the deterioration prevention agent and forms an oil passage; and
a housing that axially houses the deterioration prevention unit and the filtering unit in line in an axial direction, wherein
a horizontal sectional area of a space between an inner wall of the housing and an outer periphery of the deterioration prevention unit is smaller than a horizontal sectional area of a space between the inner wall of the housing and an outer periphery of the filtering unit, and
the ratio of the horizontal sectional area of the space between the inner wall of the housing and the outer periphery of the deterioration prevention unit to the horizontal sectional area of the space between the inner wall of the housing and the outer periphery of the filtering unit is 0.1 to less than 1, and wherein
the passage walls are at least one of spirally and concentrically arranged about the axis of the housing, the oil passage being defined between the passage walls that are adjacent each other,
the housing is provided with an oil inflow port that is open near one end of the deterioration prevention unit in the axial direction on a side of the housing that is apart from the filtering unit, and
the oil inflow port is open facing an end face of the oil passage in the axial direction.

2. The oil deterioration prevention device according to claim 1, wherein the passage walls has a wave portion formed into a wave shape.

3. The oil deterioration prevention device according to claim 1, wherein the filtering unit is cylindrically shaped, and the deterioration prevention unit is cylindrically shaped, and
the filtering unit and the deterioration prevention unit are housed in the housing in line along the axial direction.

4. The oil deterioration prevention device according to claim 1, wherein a cylindrical protector is arranged in the housing along its axial direction, the protector includes a first support portion supporting the filter element and a second support portion continuous with one end of the first support portion and supporting the deterioration prevention unit, and the first support portion is formed with a plurality of through-holes.

5. The oil deterioration prevention device according to claim 1, wherein the ratio of the horizontal sectional area of the space between the inner wall of the housing and the outer periphery of the deterioration prevention unit to the horizontal sectional area of the space between the inner wall of the housing and the outer periphery of the filtering unit is 0.25 to 0.75.

* * * * *